US012687752B2

(12) United States Patent
Kurokawa

(10) Patent No.: US 12,687,752 B2
(45) Date of Patent: Jul. 21, 2026

(54) LIGHT CONTROL DEVICE

(71) Applicant: TOPPAN HOLDINGS INC., Tokyo (JP)

(72) Inventor: Yuka Kurokawa, Taito-ku (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 18/912,647

(22) Filed: Oct. 11, 2024

(65) Prior Publication Data

US 2025/0035993 A1 Jan. 30, 2025

Related U.S. Application Data

(63) Continuation of application No. PCT/JP2023/015085, filed on Apr. 13, 2023.

(30) Foreign Application Priority Data

Apr. 14, 2022 (JP) ................................ 2022-067095

(51) Int. Cl.

*G02F 1/1343* (2006.01)
*G02F 1/133* (2006.01)
*G02F 1/1334* (2006.01)
*G02F 1/1337* (2006.01)
*G02F 1/1341* (2006.01)

(52) U.S. Cl.

CPC ...... *G02F 1/13439* (2013.01); *G02F 1/13306* (2013.01); *G02F 1/1334* (2013.01); *G02F 1/1337* (2013.01); *G02F 1/1341* (2013.01)

(58) Field of Classification Search

CPC . G02F 1/13439; G02F 1/13306; G02F 1/1334
See application file for complete search history.

(56) References Cited

U.S. PATENT DOCUMENTS

| | | | | |
|---|---|---|---|---|
| 2003/0020865 | A1* | 1/2003 | Hoke | G02F 1/216 349/198 |
| 2008/0211836 | A1* | 9/2008 | Stanley | G09G 3/02 345/694 |
| 2014/0340589 | A1* | 11/2014 | Montbach | G02F 1/13336 349/12 |
| 2021/0116760 | A1* | 4/2021 | Aso | G02F 1/1347 |

FOREIGN PATENT DOCUMENTS

JP 2021-009187 A 1/2021

OTHER PUBLICATIONS

International Search Report issued Jun. 20, 2023 in PCT/JP2023/015085, filed Apr. 13, 2023, with English translation, 5 pages.

* cited by examiner

*Primary Examiner* — Lucy P Chien
(74) *Attorney, Agent, or Firm* — Oblon, McClelland, Maier & Neustadt, L.L.P.

(57) ABSTRACT

A first light control device includes a first light control sheet and a driving unit that applies voltage to the first light control sheet. The haze of the first light control sheet is 80% or more when the first voltage is applied, and the haze of the first light control sheet is less than 10% when the second voltage is applied. In the first light control sheet, the difference in lightness index L* between when the second and third voltages are applied is 20 or more, and the difference in color coordinate a* is 15 or more or the difference in color coordinate b* is 20 or more between when the second and third voltages are applied.

10 Claims, 5 Drawing Sheets

| Example1-1 | | | | | | | |
|---|---|---|---|---|---|---|---|
| V | 0 | 6 | 12 | 18 | 24 | 48 | 100 |
| YI | 30.6 | 41.8 | 110.9 | 77.1 | 33.5 | 11.0 | 6.2 |
| L* | 1.7 | 2.0 | 10.1 | 47.9 | 78.5 | 91.2 | 93.2 |
| a* | 0.1 | 0.4 | 7.2 | 4.8 | -0.6 | -1.2 | -0.9 |
| b* | 0.7 | 1.0 | 11.8 | 26.4 | 16.2 | 6.0 | 3.4 |
| ΔYI | -24.4 | -35.6 | -104.7 | -70.9 | -27.3 | -4.8 | 0.0 |
| ΔL | 91.5 | 91.2 | 83.1 | 45.3 | 14.7 | 2.0 | 0.0 |
| Δa* | -1.0 | -1.3 | -8.1 | -5.7 | -0.3 | 0.3 | 0.0 |
| Δb* | 2.7 | 2.4 | -8.4 | -23.0 | -12.8 | -2.6 | 0.0 |
| Haze | 99 | 99 | 98 | 78 | 45 | 10 | 6 |

FIG.5

| Comp. Example1-1 | | | | | | |
|---|---|---|---|---|---|---|
| V | 0 | 12 | 18 | 24 | 48 | 100 |
| YI | 120.4 | 116.9 | 49.3 | 21.5 | 6.3 | 2.4 |
| L* | 1.5 | 10.0 | 32.2 | 41.5 | 46.6 | 47.8 |
| a* | 2.0 | 6.5 | 0.6 | -1.2 | -1.8 | -1.8 |
| b* | 1.7 | 12.8 | 12.4 | 6.5 | 2.5 | 1.4 |
| ⊿YI | -118.0 | -114.5 | -46.9 | -19.1 | -3.9 | 0.0 |
| ⊿L | 46.3 | 37.8 | 15.6 | 6.3 | 1.2 | 0.0 |
| ⊿a* | -3.8 | -8.3 | -2.4 | -0.6 | 0.0 | 0.0 |
| ⊿b* | -0.3 | -11.4 | -11.0 | -5.1 | -1.1 | 0.0 |
| Haze | 98 | 97 | 40 | 38 | 11 | 6 |

FIG.6

| Comp. Example1-2 | | | | | |
|---|---|---|---|---|---|
| V | 0 | 6 | 12 | 24 | 48 |
| YI | 29.1 | 80.3 | 42.6 | 12.2 | 8.3 |
| L* | 4.1 | 16.3 | 73.7 | 91.2 | 92.6 |
| a* | 0.7 | 5.4 | -0.1 | -1.9 | -1.7 |
| b* | 1.4 | 12.0 | 20.0 | 6.9 | 4.8 |
| ⊿YI | -20.8 | -72.0 | -34.3 | -3.9 | 0.0 |
| ⊿L | 88.5 | 76.3 | 18.9 | 1.4 | 0.0 |
| ⊿a* | -2.4 | -7.1 | -1.6 | 0.2 | 0.0 |
| ⊿b* | 3.4 | -7.2 | -15.2 | -2.1 | 0.0 |
| Haze | 98 | 97 | 91 | 17 | 8 |

FIG.7

| Example2-1 | | | | | | | |
|---|---|---|---|---|---|---|---|
| V | 0 | 6 | 8 | 10 | 12 | 24 | 48 |
| YI | 5.3 | 6.1 | 23.9 | 56.7 | -36.8 | -108.7 | -117.5 |
| L* | 91.6 | 91.7 | 82.8 | 60.1 | 46.9 | 45.7 | 46.4 |
| a* | -0.8 | -0.8 | -0.6 | 4.1 | 15.6 | 13.5 | 12.3 |
| b* | 2.9 | 3.3 | 11.8 | 21.3 | -15.1 | -28.3 | -29.8 |
| ⊿YI | 0.0 | -0.8 | -18.6 | -51.4 | 42.1 | 114.0 | 122.8 |
| ⊿L | 0.0 | -0.1 | 8.8 | 31.5 | 44.7 | 45.9 | 45.2 |
| ⊿a* | 0.0 | 0.0 | -0.2 | -4.9 | -16.4 | -14.3 | -13.1 |
| ⊿b* | 0.0 | -0.4 | -8.9 | -18.4 | 18.0 | 31.2 | 32.7 |
| Haze | 8 | 10 | 18 | 52 | 85 | 90 | 90 |

FIG.8

| Example2-2 | | | |
|---|---|---|---|
| V | 0 | 48 | 100 |
| YI | 25.9 | 84.9 | 92.8 |
| L* | 85.8 | 61.8 | 59.3 |
| a* | -1.0 | 4.0 | 5.1 |
| b* | 13.4 | 38.7 | 42.1 |
| ⊿YI | 0.0 | -59.0 | -66.9 |
| ⊿L | 0.0 | 24.0 | 26.5 |
| ⊿a* | 0.0 | -5.0 | -6.1 |
| ⊿b* | 0.0 | -25.3 | -28.7 |
| Haze | 10 | 65 | 80 |

FIG.9

| Example2-3 | | | | |
|---|---|---|---|---|
| V | 0 | 48 | 100 | 135 |
| YI | 7.5 | 83.0 | 103.9 | 106.5 |
| L* | 92.5 | 59.3 | 50.7 | 49.5 |
| a* | -0.6 | 4.8 | 8.2 | 8.7 |
| b* | 4.0 | 35.5 | 41.5 | 42.0 |
| ⊿YI | 0.0 | -75.5 | -96.4 | -99.0 |
| ⊿L | 0.0 | 33.2 | 41.8 | 43.0 |
| ⊿a* | 0.0 | -5.4 | -8.8 | -9.3 |
| ⊿b* | 0.0 | -31.5 | -37.5 | -38.0 |
| Haze | 7 | 70 | 85 | 88 |

FIG.10

| Comp. Example2-1 | | | | |
|---|---|---|---|---|
| V | 0 | 12 | 24 | 48 |
| YI | 15.1 | 22.1 | 47.0 | 47.3 |
| L* | 89.6 | 86.6 | 76.1 | 70.1 |
| a* | -0.9 | -0.9 | 0.3 | -5.2 |
| b* | 7.9 | 11.3 | 22.8 | 24.4 |
| ⊿YI | 0.0 | -7.0 | -31.9 | -32.2 |
| ⊿L | 0.0 | 3.0 | 13.5 | 19.5 |
| ⊿a* | 0.0 | 0.0 | -1.2 | 4.3 |
| ⊿b* | 0.0 | -3.4 | -14.9 | -16.5 |
| Haze | 8 | 78 | 88 | 90 |

LIGHT CONTROL DEVICE

CROSS-REFERENCE TO RELATED APPLICATIONS

The present application is a continuation of and claims the benefit of priority to International Application No. PCT/JP2023/015085, filed Apr. 13, 2023, which is based upon and claims the benefit of priority to Japanese Application No. 2022-067095, filed Apr. 14, 2022. The entire contents of these applications are incorporated herein by reference.

BACKGROUND OF THE INVENTION

Field of the Invention

The present invention relates to a light control device.

Description of Background Art

JP 2021-9187 A describes a light control device. The entire contents of this publication are incorporated herein by reference.

SUMMARY OF THE INVENTION

According to one aspect of the present invention, a light control device includes a light control sheet including a first transparent electrode layer, a second transparent electrode layer, and a light control layer formed between the first and second transparent electrode layers, and a driving unit including circuitry that applies a first voltage, a second voltage, and a third voltage to the light control sheet such that a potential difference between the first transparent electrode layer and the second transparent electrode layer is zero at the first voltage and that the third voltage has a magnitude between the first and second voltages. The light control layer of the light control sheet includes a transparent polymer layer having voids and a liquid crystal composition filling the voids, and the light control sheet has a haze of 80% or more when the first voltage is applied, the haze of less than 10% when the second voltage is applied, a difference of 20 or more in lightness index L* between when the second voltage is applied and when the third voltage is applied, and a difference of 15 or more in color coordinate a* or a difference of 20 or more in color coordinate b* between when the second voltage is applied and when the third voltage is applied.

According to another aspect of the present invention, a light control device includes a light control sheet including a first transparent electrode layer, a second transparent electrode layer, a light control layer formed between the first and second transparent electrode layers, a first alignment layer formed between the first transparent electrode layer and the light control layer, and a second alignment layer formed between the second transparent electrode layer and the light control layer, and a driving unit including circuitry that applies a first voltage, a second voltage, and a third voltage to the light control sheet such that a potential difference between the first transparent electrode layer and the second transparent electrode layer is zero at the second voltage and that the third voltage has a magnitude between the first and second voltages. The light control layer of the light control sheet includes a transparent polymer layer having voids and a liquid crystal composition filling the voids, and the light control sheet has a haze of 80% or more when the first voltage is applied and is a minimum voltage value, the haze of 15% or less when the second voltage is applied, a difference 20 or more in lightness index L* between when the second voltage is applied and when the third voltage is applied, and a difference of 15 or more in color coordinate a* or a difference of is 20 or more in color coordinate b* between when the second voltage is applied and when the third voltage is applied.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a table showing the relationship between the driving voltage and the optical characteristics of the light control sheet of the light control device of Comparative Example 1-1;

FIG. 6 is a table showing the relationship between the driving voltage and the optical characteristics of the light control sheet of the light control device of Comparative Example 1-2;

FIG. 7 is a table showing the relationship between the driving voltage and the optical characteristics of the light control sheet of the light control device of Example 2-1;

FIG. 8 is a table showing the relationship between the driving voltage and the optical characteristics of the light control sheet of the light control device of Example 2-2;

FIG. 9 is a table showing the relationship between the driving voltage and the optical characteristics of the light control sheet of the light control device of Example 2-3; and FIG. 10 is a table showing the relationship between the driving voltage and the optical characteristics of the light control sheet of the light control device of Comparative Example 2-1.

DETAILED DESCRIPTION OF THE EMBODIMENTS

Figure 1:
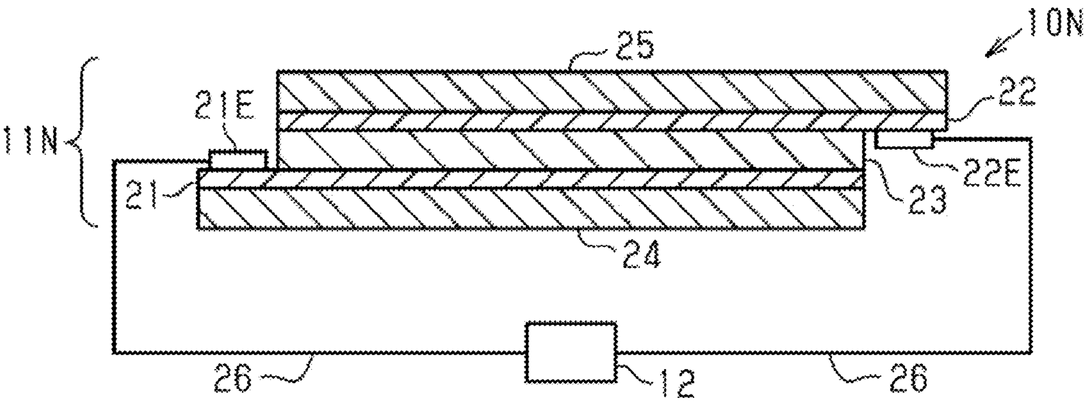
FIG. 1 is a cross-sectional view showing the structure of a light control device including a first light control sheet of a normal type as a first example of a light control device.

Embodiments will now be described with reference to the accompanying drawings, wherein like reference numerals designate corresponding or identical elements throughout the various drawings.

An embodiment of a light control device will be described with reference to FIGS. 1 to 10. A light control sheet of a light control device according to an embodiment of the present invention may be either of the normal type or reverse type. A first light control device including a normal-type first light control sheet and a driving unit will be described with reference to FIG. 1. In addition, a second light control device including a reverse-type second light control sheet and a driving unit will be described with reference to FIG. 2.

The light control sheets can be attached to, for example, transparent members provided in window glass of various buildings, such as houses, stations, and airports, partitions in offices, and display windows in stores. They can also be attached to transparent members provided in windows of moving objects such as vehicles and aircraft. The shape of a light control sheet may be flat or curved.

First Light Control Device

As shown in FIG. 1, a first light control device 10N includes a normal-type first light control sheet 11N and a driving unit 12. The first light control sheet 11N includes a first transparent electrode layer 21, a second transparent electrode layer 22, and a light control layer 23. The first light control sheet 11N further includes a first transparent substrate 24 supporting the first transparent electrode layer 21 and a second transparent substrate 25 supporting the second transparent electrode layer 22.

The first light control sheet 11N includes a first electrode 21E attached to a part of the first transparent electrode layer 21 and a second electrode 22E attached to a part of the second transparent electrode layer 22. The first light control sheet 11N further includes wiring 26 connected to the first electrode 21E and wiring 26 connected to the second electrode 22E. The first electrode 21E is connected to the driving unit 12 by the wiring 26. The second electrode 22E is connected to the driving unit 12 by the wiring 26.

The first and second transparent electrode layers 21 and 22 apply voltage to the light control layer 23 to switch the light control layer 23 between transparent and opaque. The transparent electrode layers 21 and 22 both transmit visible light. The light transmittance of the first transparent electrode layer 21 allows visual recognition of objects through the first light control sheet 11N. Similarly to the light transmittance of the first transparent electrode layer 21, the light transmittance of the second transparent electrode layer 22 allows visual recognition of objects through the first light control sheet 11N.

The material for forming the transparent electrode layers 21 and 22 may be one selected from indium tin oxide, fluorine-doped tin oxide, tin oxide, zinc oxide, carbon nanotubes, and poly(3,4-ethylenedioxythiophene).

The light control layer 23 includes a transparent polymer layer and a liquid crystal composition. The transparent polymer layer has voids filled with the liquid crystal composition. The liquid crystal composition is filled in the voids in the transparent polymer layer. The shape of the voids may be spherical, ellipsoidal, or irregular. When the voids have a circular shape in a cross section along the thickness direction of the first light control sheet 11N, the void size refers to the diameter of the voids. When the voids have an ellipsoidal shape in a cross section along the thickness direction of the first light control sheet 11N, the void size refers to the major axis of the voids. When the voids have an irregular shape in a cross section in the thickness direction of the first light control sheet 11N, the void size refers to the diameter of the circumscribed circle of the void. The void size may be, for example, 0.5 μm or more and 5.0 μm or less, preferably 1.5 μm or more and 3.0 μm or less.

The type in which the liquid crystal composition is held is one selected from a polymer network type, a polymer dispersion type, and a capsule type. The polymer network type has a transparent three-dimensional mesh polymer network and holds the liquid crystal composition in the voids in the mesh polymer network. The polymer network is an example of a transparent polymer layer. The polymer dispersed type has a large number of isolated voids in the transparent polymer layer and hold the liquid crystal composition in the voids dispersed in the transparent polymer layer. The capsule type holds an encapsulated liquid crystal composition in the transparent polymer layer. This allows the transparent polymer layer to be formed with voids filled with the liquid crystal composition.

The liquid crystal composition contains liquid crystal molecules. An example of liquid crystal molecules is at least one selected from those based on Schiff bases, azo types, azoxy types, biphenyls, terphenyls, benzoic acid esters, tolan types, pyrimidines, pyridazines, cyclohexanecarboxylic acid esters, phenylcyclohexanes, biphenylcyclohexanes, dicyanobenzenes, naphthalenes, and dioxanes. The liquid crystal composition contains positive-type nematic liquid crystal molecules having positive dielectric anisotropy.

The transparent polymer layer is a cured product of a photopolymerizable compound. The photopolymerizable compound may be an ultraviolet-curable compound or an electron beam-curable compound. The photopolymerizable compound is compatible with the liquid crystal composition. In order to improve the controllability of the void size, the photopolymerizable compound is preferably an ultraviolet-curable compound. An example of an ultraviolet-curable compound contains polymerizable unsaturated bonds at terminals of the molecular structure. Alternatively, the ultraviolet-curable compound may contain polymerizable unsaturated bonds at parts other than the terminals of the molecular structure. The photopolymerizable compound is a single polymerizable compound or a combination of two or more polymerizable compounds.

The ultraviolet-curable compound is at least one selected from acrylate compounds, methacrylate compounds, styrene compounds, thiol compounds, and oligomers of these compounds. That is, the ultraviolet-curable compound may be just one selected from acrylate compounds, methacrylate compounds, styrene compounds, thiol compounds, and oligomers of these compounds, or a combination of two or more thereof.

Acrylate compounds include monoacrylate compounds, diacrylate compounds, triacrylate compounds, and tetraacrylate compounds. Examples of acrylate compounds are butyl ethyl acrylate, ethylhexyl acrylate, and cyclohexyl acrylate. Examples of methacrylate compounds are dimethacrylate compounds, trimethacrylate compounds, and tetramethacrylate compounds. Examples of methacrylate compounds are N,N-dimethylaminoethyl methacrylate, phenoxyethyl methacrylate, methoxyethyl methacrylate, and tetrahydrofurfuryl methacrylate. Examples of thiol compounds are 1,3-propanedithiol and 1,6-hexanedithiol. Examples of styrene compounds are styrene and methylstyrene.

The lower limit value of the content of the transparent polymer layer relative to the total amount of the transparent polymer layer and the liquid crystal composition may be 30% by mass, and a more preferable lower limit value of the content may be 40% by mass. The upper limit of the content of the transparent polymer layer relative to the total amount of the transparent polymer layer and the liquid crystal composition may be 70% by mass, and a more preferable upper limit of the content may be 60% by mass.

The lower and upper limit values of the content of the transparent polymer layer define the range in which liquid crystal particles made of the liquid crystal composition undergo phase separation from the cured photopolymerizable compound during the curing process of the photopolymerizable compound. When it is required to increase the mechanical strength of the transparent polymer layer, it is preferable that the lower limit value of the content of the transparent polymer layer is high. When it is required to reduce the driving voltage of the liquid crystal molecules, it is preferable that the upper limit of the content of the transparent polymer layer is low.

In the present embodiment, the liquid crystal composition may contain a dichroic dye. The dichroic dye has an elongated shape. The absorbance in the visible region in the long axis direction of the dichroic dye molecules is greater than the absorbance in the visible range in the short axis direction of the molecules. The dichroic dye is substantially transparent when its long axis is parallel or approximately parallel to the direction of incidence of light. In contrast, the dichroic dye exhibits a certain color when its long axis is perpendicular or approximately perpendicular to the direction of incidence of light.

Therefore, the dichroic dye is transparent when oriented so that its long axis direction is parallel or approximately parallel to the normal direction of the contact surface of the light control layer 23 with the first transparent electrode layer 21 and the contact surface of the light control layer 23 with the second transparent electrode layer 22. In contrast, the dichroic dye exhibits a certain color when oriented so that its long axis direction is perpendicular or approximately perpendicular to the normal direction of the contact surface of the light control layer 23 with the first transparent electrode layer 21 and the contact surface of the light control layer 23 with the second transparent electrode layer 22. The color exhibited by the dichroic dye is preferably black or a color close to black. The dichroic dye is driven by a guest host system using the liquid crystal molecules as the host to cause the dichroic dye to exhibit color.

The dichroic dye may be at least one selected from polyiodides, azo compounds, anthraquinone compounds, naphthoquinone compounds, azomethine compounds, tetrazine compounds, quinophthalone compounds, merocyanine compounds, perylene compounds, and dioxazine compounds. That is, the dichroic dye may be a single dye or a combination of two or more dyes. To improve the light resistance of the dichroic dye and increase the dichroic ratio, the dichroic dye is preferably at least one selected from azo compounds and anthraquinone compounds. That is, the dichroic dye may be either one of an azo compound and an anthraquinone compound, or may contain both. The dichroic dye is preferably an azo compound.

The liquid crystal composition may contain, in addition to the above-mentioned liquid crystal molecules and dichroic dye, for example, a monomer for forming the transparent polymer layer.

The material forming the transparent substrates 24 and 25 may be a synthetic resin or an inorganic compound. Examples of synthetic resin include polyesters, polyacrylates, polycarbonates, and polyolefins. Examples of polyesters include polyethylene terephthalate and polyethylene naphthalate. Examples of polyacrylates include polymethyl methacrylate. Examples of the inorganic compound include silicon dioxide, silicon oxynitride, and silicon nitride. The transparent substrates 24 and 25 may have a thickness of, for example, 250 μm or less.

The electrodes 21E and 22E are, for example, flexible printed circuit boards (FPCs). A FPC includes a support layer, a conductor, and a protective layer. The conductor is sandwiched between the support layer and the protective layer. The support layer and the protective layer are made of insulating synthetic resin. For example, the support layer and the protective layer are made of polyimide. The conductor is formed of, for example, a metal thin film. The material forming the metal thin film may be, for example, copper. The electrodes 21E and 22E are not limited to FPCs, and may be, for example, metal tapes.

The electrodes 21E and 22E are attached to the transparent electrode layers 21 and 22, respectively, by a conductive adhesive layer (not shown). In the part of each of the electrodes 21E and 22E that is connected to the conductive adhesive layer, the conductor is exposed from the protective layer or the support layer.

The conductive adhesive layer may be formed of, for example, an anisotropic conductive film (ACF), an anisotropic conductive paste (ACP), an isotropic conductive film (ICF), or an isotropic conductive paste (ICP). From the viewpoint of ease of handling in the manufacturing process of the first light control device 10N, the conductive adhesive layer is preferably an anisotropic conductive film.

Each wiring 26 may be formed of, for example, metal wires and an insulating layer covering the metal wires. The wire is formed of, for example, copper.

The driving unit 12 applies an AC voltage across the first and second transparent electrode layers 21 and 22. It is preferable that the driving unit 12 applies an AC voltage in the form of a square wave across the pair of transparent electrode layers 21 and 22. In other words, the driving unit 12 preferably outputs a square wave voltage signal.

When no voltage is applied to the light control layer 23, there is no particular regularity in the orientation of the liquid crystal molecules in the long axis direction. That is, the liquid crystal molecules are oriented randomly in the voids. As a result, the light control layer 23, and thus the first light control sheet 11N, are opaque when no voltage is applied to the light control layer 23. In other words, the first light control sheet 11N has a relatively high haze value.

When a voltage is applied to the light control layer 23, the liquid crystal molecules are oriented parallel to the electric field. The first light control sheet 11N is configured so that when a voltage is applied to the light control layer 23, the long axis direction of the liquid crystal molecules is perpendicular to the contact surfaces described above. That is, the liquid crystal molecules are oriented vertically. Therefore, the light control layer 23, and thus the first light control sheet 11N, are transparent when voltage is applied to the light control layer 23. This means that the first light control sheet 11N has a relatively low haze value.

Optical Characteristics of First Light Control Sheet

The first light control device 10N satisfies the following conditions 1-1 to 1-4.

Condition 1-1. The haze of the first light control sheet 11N when the driving unit 12 applies a first voltage VN1 to the first light control sheet 11N is 80% or more.

Condition 1-2. The haze of the first light control sheet 11N when the driving unit 12 applies a second voltage VN2 to the first light control sheet 11N is less than 10%.

Condition 1-3. In the first light control sheet 11N, the difference in lightness index L* between when the second voltage VN2 is applied and when the third voltage VN3 is applied is 20 or more.

Condition 1-4. In the first light control sheet 11N, the difference in color coordinate a* is 15 or more, or the difference in color coordinate b* is 20 or more between when the second voltage VN2 is applied and when the third voltage VN3 is applied.

Of the first to third voltages VN1 to VN3 applied by the driving unit 12 to the first light control sheet 11N, at the first voltage VN1, the potential difference between the first and second transparent electrode layers 21 and 22 is zero, and the third voltage VN3 has a magnitude between the first and second voltages VN1 and VN2. When the first voltage VN1 is applied to the first light control sheet 11N, the first light control sheet 11N is opaque. When the second voltage VN2 is applied to the first light control sheet 11N, the first light control sheet 11N is transparent. When the third voltage VN3 is applied to the first light control sheet 11N, the first light control sheet 11N exhibits a middle tone between transparent and opaque.

The haze value of the first light control sheet 11N is determined by a method in accordance with JIS K 7136: 2000 "Plastics-Determination of haze". The lightness index L*, color coordinates a* and b* of the first light control sheet 11N are determined by a method in accordance with JIS Z 8781-4:2013 "Colorimetry-Part 4: CIE 1976 L*a*b* Colour space".

Because the first light control device 10N satisfies the conditions 1-1 to 1-4, by applying the third voltage VN3 to the first light control sheet 11N, the first light control sheet 11N can exhibit a color that is darker than when the second voltage VN2 is applied and has a different color coordinate a* or b* from when the second voltage VN2 is applied.

Further, according to the first light control device 10N, even if the liquid crystal composition does not contain a dichroic dye, the first light control sheet 11N can exhibit a color different from that when the second voltage VN2 is applied. Therefore, no color change occurs due to photodecomposition of the dichroic dye, and it is possible to suppress fading of the first light control sheet 11N due to light.

The first light control sheet 10N can further satisfy at least one of the following conditions. That is, the first light control device 10N may satisfy the condition 1-5 or 1-6, or both the conditions 1-5 and 1-6 below.

Condition 1-5. In the first light control sheet 11N, the difference in lightness index L* between when the second and first voltages VN2 and VN1 are applied is 90 or more, the difference in color coordinate a* between when the second and first voltages VN2 and VN1 are applied is 1.5 or less, and the difference in color coordinate b* between when the second and first voltages VN2 and VN1 are applied is 3.0 or less.

Condition 1-6. In the first light control sheet 11N, the color coordinates a* and b* have local maximum values at a voltage with a magnitude between the first and second voltages VN1 and VN2.

If the first light control device 10N satisfies the condition 1-5, by applying the second voltage VN2 to the first light control sheet 11N, the first light control sheet 11N can be made brighter than when the first voltage VN1 is applied, while maintaining the color close to the color exhibited by the first light control sheet 11N when the first voltage VN1 is applied. If the first light control device 10N satisfies the condition 1-6, by applying a voltage at which the color coordinate a* or b* has a local maximum value to the first light control sheet 11N, it is possible to maximize the deviation in color coordinate a* or b* of the color exhibited by the first light control sheet 11N from that exhibited by the first light control sheet 11N when the first or second voltage VN1 or VN2 is applied to the first light control sheet 11N.

The voltage values at which the color coordinates a* and b* have local maximum values may be the same as or different from the third voltage VR3.

Second Light Control Device

Figure 2:
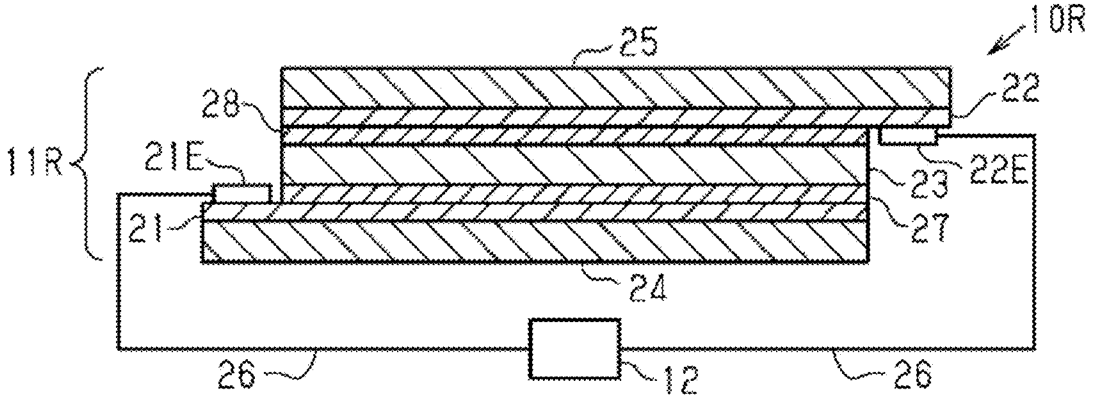
FIG. 2 is a cross-sectional view showing the structure of a light control device including a second light control sheet of a reverse type as a second example of a light control device.

As shown in FIG. 2, a second light control device 10R includes a reverse-type second light control sheet 11R and the driving unit 12. The second light control sheet 11R includes a first alignment layer 27 and a second alignment layer 28 in addition to the layers included in the first light control sheet 11N. The light control layer 23 is formed between the first and second alignment layers 27 and 28. The first alignment layer 27 is formed between the light control layer 23 and the first transparent electrode layer 21 and is in contact with the light control layer 23. The second alignment layer 28 is formed between the light control layer 23 and the second transparent electrode layer 22 and is in contact with the light control layer 23.

The materials for forming the first and second alignment layers 27 and 28 are organic compounds, inorganic compounds, and mixtures thereof. Examples of the organic compounds are polyimides, polyamides, polyvinyl alcohols, and cyanide compounds. Examples of the inorganic compounds are silicon oxide and zirconium oxide. The material for forming the alignment layers 27 and 28 may be silicone. Silicone is a compound that has both inorganic and organic parts.

The first and second alignment layers 27 and 28 are, for example, vertical alignment layers. The vertical alignment layers align the liquid crystal molecules so that their long axis direction is perpendicular to the surface opposite to the surface in contact with the first transparent electrode layer 21 and the surface opposite to the surface in contact with the second transparent electrode layer 22. In this manner, the alignment layers 27 and 28 regulate the orientation of the liquid crystal molecules contained in the light control layer 23.

Similarly to the light control layer 23 of the first light control sheet 11N, the light control layer 23 includes a transparent polymer layer having voids, and a liquid crystal composition filled in the voids. The liquid crystal composition contains liquid crystal molecules. The liquid crystal composition contains negative-type nematic liquid crystal molecules having negative dielectric anisotropy. Similarly to the liquid crystal composition of the first light control sheet 11N, the liquid crystal composition may contain at least one of a dichroic dye and a monomer.

When no voltage is applied to the light control layer 23, the liquid crystal molecules are oriented perpendicular to the contact surfaces due to the orientation regulation force of the alignment layers 27 and 28. Therefore, the light control layer 23, and thus the second light control sheet 11R, are transparent when voltage is not applied to the light control layer 23. This means that the second light control sheet 11R has a relatively low haze value.

When a voltage is applied to the light control layer 23, the liquid crystal molecules are oriented perpendicular to the electric field. The second light control sheet 11R is configured so that when a voltage is applied to the light control layer 23, the long axis direction of the liquid crystal molecules is parallel to the contact surfaces described above. That is, the liquid crystal molecules are oriented horizontally. Therefore, the light control layer 23, and thus the second light control sheet 11R, are opaque when voltage is applied to the light control layer 23. This means that the second light control sheet 11R has a relatively high haze value.

Optical Characteristics of Second Light Control Sheet

The second light control device 10R satisfies the following conditions 2-1 to 2-4.

Condition 2-1. The haze of the second light control sheet 11R is 80% or more when the first voltage VR1 is applied, and the first voltage VR1 is the minimum voltage value at which the haze of the second light control sheet 11R is 80% or more.

Condition 2-2. The haze of the second light control sheet 11R when the second voltage VR2 is applied is 15% or less.

Condition 2-3. The difference in lightness index L* between when the second voltage VR2 is applied and when the third voltage VR3 is applied is 20 or more.

Condition 2-4. The difference in color coordinate a* is 15 or more, or the difference in color coordinate b* is 20 or more between when the second voltage VR2 is applied and when the third voltage VR3 is applied.

The driving unit 12 applies the first to third voltages VR1 to VR3 to the second light control sheet 11R. At the second voltage VR2, the potential difference between the first and second transparent electrode layers 21 and 22 is zero, and the third voltage VR3 has a magnitude between the first and second voltages VR1 and VR2. When the first voltage VR1 is applied to the first light control sheet 11N, the second light control sheet 11R is opaque. When the second voltage VR2 is applied to the first light control sheet 11N, the second light control sheet 11R is transparent. When the third voltage VR3 is applied to the first light control sheet 11N, the second light control sheet 11R exhibits a middle tone between transparent and opaque.

The haze value of the second light control sheet 11R is determined by a method in accordance with JIS K 7136: 2000 "Plastics-Determination of haze". The lightness index L*, color coordinates a* and b* of the second light control sheet 11R are determined by a method in accordance with JIS Z 8781-4:2013 "Colorimetry-Part 4: CIE 1976 L*a*b* Colour space".

By applying the third voltage VR3 to the second light control sheet 11R, the second light control sheet 11R can exhibit a color that is darker than when the second voltage VR2 is applied and has a different color coordinate a* or b* from when the second voltage VR2 is applied. Further, according to the second light control device 10R, even if the liquid crystal composition does not contain a dichroic dye, the second light control sheet 11R can exhibit a color different from that when the second voltage VR2 is applied. Therefore, no color change occurs due to photodecomposition of the dichroic dye, and it is possible to suppress fading of the second light control sheet 11R due to light.

The second light control sheet 10R can further satisfy at least one of the following conditions. That is, the second light control device 10R may satisfy condition 2-5 or 2-6, or both the conditions 2-5 and 2-6 below.

Condition 2-5. The difference in lightness color coordinate b* between when the second voltage VR2 is applied and when the third voltage VR3 is applied is 30 or more.

Condition 2-6. The difference in color coordinate b* between when the second and third voltages VR2 and VR3 are applied is 20 or more, the difference in lightness index L* between when the second and first voltages VR2 and VR1 are applied is 20 or more, and the difference in color coordinate b* between when the second and first voltages VR2 and VR1 are applied is 20 or more.

If the second light control device 10R satisfies the condition 2-5, by applying the third voltage VR3 to the second light control sheet 11R, the second light control sheet 11R can exhibit a color that is more noticeably different from when the second voltage VR2 is applied to the second light control sheet 11R. If the second light control device 10R satisfies the condition 2-6, both when the second voltage VR2 is applied to the second light control sheet 11R and when the third voltage VR3 is applied to the second light sheet 11R, the second light control sheet 11R can exhibit a color different from that when the first voltage VR1 is applied.

EXAMPLES

Example 1-1

An acrylate compound was prepared as a monomer for forming the transparent polymer layer. Several of the positive-type nematic liquid crystals represented by the following Formulas 1 to 12 were used as the liquid crystal molecules. The refractive index anisotropy Δn of the mixture of liquid crystal molecules was adjusted to be 1.6. Then, a coating liquid containing 50 parts by mass of the liquid crystal molecules and 50 parts by mass of the monomer was prepared. In the chemical formulas listed below, R1 and R2 are independently an alkyl group having 1 to 12 carbon atoms, an alkoxy group having 1 to 12 carbon atoms, an alkenyl group having 2 to 12 carbon atoms, an alkenyloxy group having 2 to 12 carbon atoms, an alkyl group having 1 to 12 carbon atoms in which at least one hydrogen has been replaced by fluorine or chlorine, fluorine, or a cyano group.

Chemical Formula 1

Formula 1

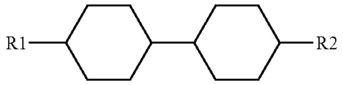

Chemical Formula 2

Formula 2

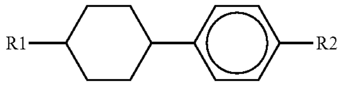

Chemical Formula 3

Formula 3

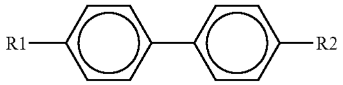

Chemical Formula 4

Formula 4

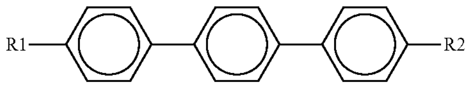

Chemical Formula 5

Formula 5

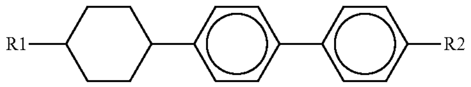

Chemical Formula 6

Formula 6

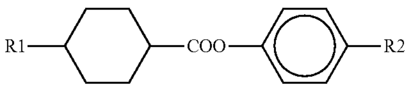

Chemical Formula 7

Formula 7

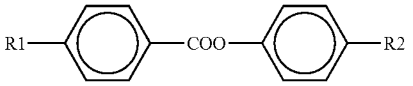

-continued

Chemical Formula 8

Formula 8

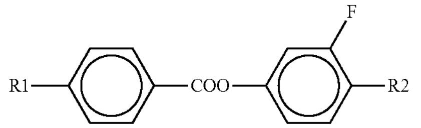

Chemical Formula 9

Formula 9

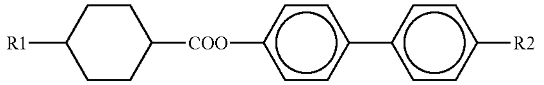

Chemical Formula 10

Formula 10

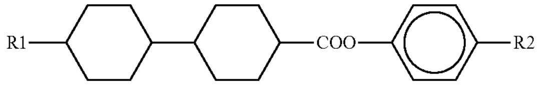

Chemical Formula 11

Formula 11

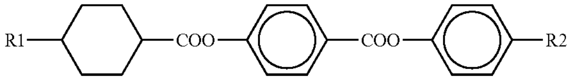

Chemical Formula 12

Formula 12

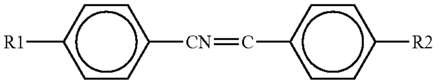

Two transparent films were prepared, each including an ITO layer having a thickness of 20 nm and a polyethylene terephthalate film having a thickness of 125 μm. The coating liquid was applied onto the ITO layer of one of the transparent films so that the formed coating film has a thickness or 10 μm after curing. After that, the ITO layer of the other transparent film was brought into contact with the coating film. In this manner, the coating film was sandwiched by a pair of transparent films.

A pair of ultraviolet lamps were placed so as to sandwich the pair of transparent films, and the coating film was irradiated with ultraviolet light using the pair of lamps. The intensity of the ultraviolet light was set to 10 mW/cm$^2$, and the irradiation time of the ultraviolet light was set to 100 seconds. Phase separation was induced in the coating film by irradiation with ultraviolet light, and a light control layer with an average void size of 0.5 μm was formed. As a result, the first light control sheet of the light control device of Example 1-1 was obtained.

Comparative Example 1-1

The first light control sheet of the light control device of Comparative Example 1-1 was obtained in the same manner as in Example 1-1, except that the coating liquid was changed to contain 30 parts by mass of liquid crystal molecules and 70 parts by mass of monomer.

Comparative Example 1-2

The first light control sheet of the light control device of Comparative Example 1-2 was obtained in the same manner as in Example 1-1, except that the intensity of the ultraviolet light was set to 1 mW/cm$^2$, and the light control layer was formed so that it had an average void size of 5.5 μm.

Example 2-1

An acrylate compound was prepared as a monomer for forming the transparent polymer layer. Several of the negative-type nematic liquid crystals represented by the following Formulas 13 to 23 were used as the liquid crystal molecules. The refractive index anisotropy Δn of the mixture of liquid crystal molecules was adjusted to be 1.6. Then, a coating liquid containing 50 parts by mass of the liquid crystal molecules and 50 parts by mass of the monomer was prepared. In the chemical formulas listed below, R1 and R2 are independently an alkyl group having 1 to 12 carbon atoms, an alkoxy group having 1 to 12 carbon atoms, an alkenyl group having 2 to 12 carbon atoms, an alkenyloxy group having 2 to 12 carbon atoms, or an alkyl group having 1 to 12 carbon atoms in which at least one hydrogen has been replaced by fluorine or chlorine.

Chemical Formula 13

Formula 13

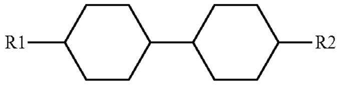

Chemical Formula 14

Formula 14

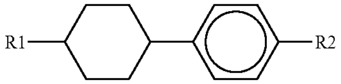

Chemical Formula 15

Formula 15

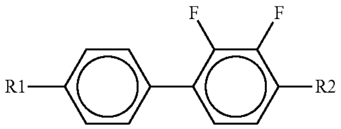

Chemical Formula 16

Formula 16

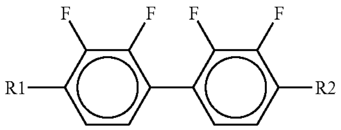

Chemical Formula 17

Formula 17

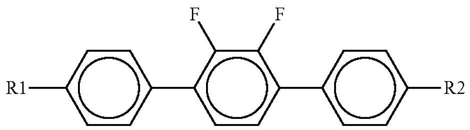

Chemical Formula 18

Formula 18

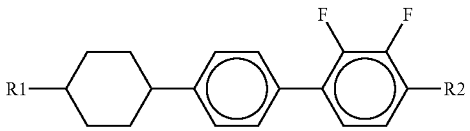

-continued

Chemical Formula 19

Formula 19

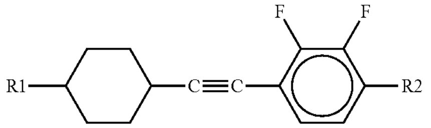

Chemical Formula 20

Formula 20

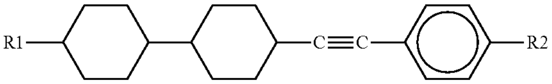

Chemical Formula 21

Formula 21

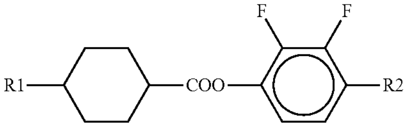

Chemical Formula 22

Formula 22

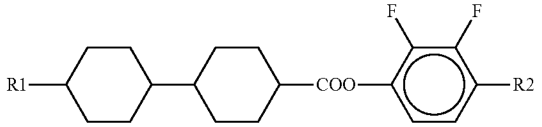

Chemical Formula 23

Formula 23

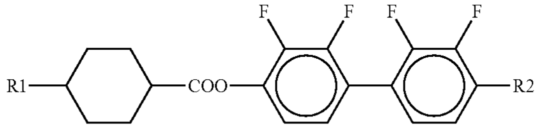

Two transparent films were prepared, each including an ITO layer having a thickness of 20 nm and a polyethylene terephthalate film having a thickness of 125 μm. On each ITO layer, an alignment layer made of polyimide and having a thickness of 100 nm was formed.

The coating liquid was applied onto the alignment layer of one of the transparent films so that the formed coating film has a thickness or 5 μm after curing. After that, the alignment layer of the other transparent film was brought into contact with the coating film. In this manner, the coating film was sandwiched by a pair of transparent films.

A pair of ultraviolet lamps were placed so as to sandwich the pair of transparent films, and the coating film was irradiated with ultraviolet light using the pair of lamps. The intensity of the ultraviolet light was set to 10 $mW/cm^2$, and the irradiation time of the ultraviolet light was set to 100 seconds. Phase separation was induced in the coating film by the irradiation with ultraviolet light, and the light control layer with an average void size of 2 μm was formed. As a result, the second light control sheet of the light control device of Example 2-1 was obtained.

Example 2-2

The first light control sheet of the light control device of Example 2-2 was obtained in the same manner as in Example 2-1, except that the coating liquid for forming the light control layer was applied so that the formed coating film had a thickness of 10 μm after curing.

Example 2-3

The first light control sheet of the light control device of Example 2-3 was obtained in the same manner as in Example 2-1, except that the intensity of the ultraviolet light was changed to 20 $mW/cm^2$ so that the average void size was changed to 1.5 μm.

Comparative Example 2-1

The first light control sheet of the light control device of Comparative Example 2-1 was obtained in the same manner as in Example 2-1, except that a coating liquid containing 30 parts by mass of liquid crystal monomers and 70 parts by mass of monomer was prepared, and the intensity of the ultraviolet light was set to 5 $mW/cm^2$ so that the average void size became 5.5 μm.

Evaluation Method

The optical characteristics of the light control sheets of the light control devices when three or more different driving voltages were applied were evaluated. As the optical characteristics of the light control sheet, the haze, the lightness index L* and color coordinates a* and b* in the La*b* color space, and the yellowness index YI were determined. As described above, the haze value was determined by a method in accordance with JIS K 7136:2000 "Plastics-Determination of haze", and the lightness index L* and color coordinates a* and b* were determined by a method in accordance with JIS Z 8781-4:2013 "Colorimetry-Part 4: CIE 1976 L*a*b* Colour space". The yellowness index YI was determined by a method in accordance with JIS K 7373:2006 "Plastics-Determination of yellowness index and change of yellowness index".

The haze value was determined using a haze meter (NDH7000 (II), manufactured by NIPPON DENSHOKU INDUSTRIES CO., LTD.). The lightness index L*, color coordinates a* and b*, and yellowness index YI were determined using a spectrophotometer (U-4100, manufactured by Hitachi High-Tech Corporation).

In Example 1-1 and Comparative Example 1-1, the yellowing index ΔYI, the lightness difference ΔL*, and the color coordinate differences Δa* and Δb* were calculated using the respective values obtained when the driving voltage was 100 V, as references. In Comparative Example 1-2, the yellowing index ΔYI, the lightness difference ΔL*, and the color coordinate differences Δa* and Δb* were calculated using the respective values obtained when the driving voltage was 48 V, as references. In Examples 2-1 and 2-2, and Comparative Examples 2-1 and 2-2, the yellowing index ΔYI, the lightness difference ΔL*, and the color coordinate differences Δa* and Δb* were calculated using the respective values obtained when the driving voltage was 0 V, as references.

Evaluation Results

Figures 3, 4:
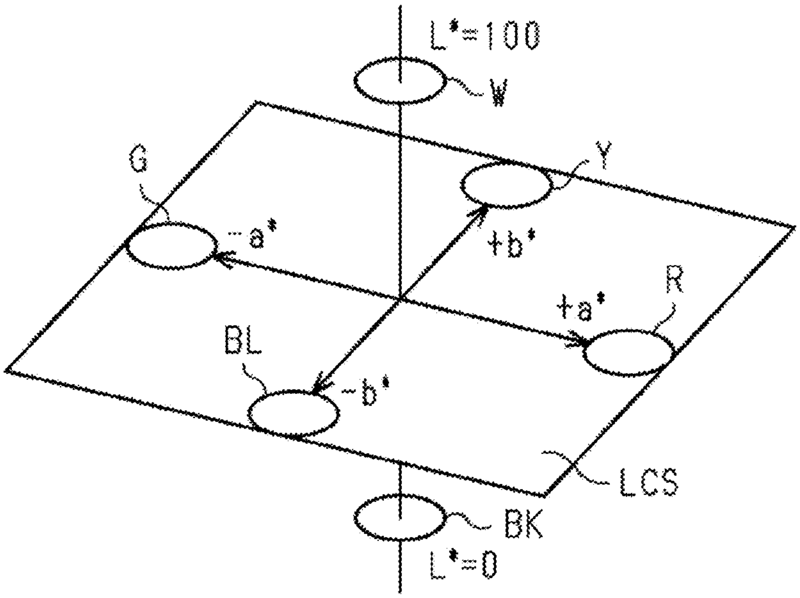
FIG. 3 is a schematic diagram showing a color space defined by the L*a*b* color system.
FIG. 4 is a table showing the relationship between the driving voltage and the optical characteristics of the light control sheet of the light control device of Example 1-1.

The evaluation results of the Examples and Comparative Examples will be described with reference to FIGS. 3 to 10. Each figure shows driving voltages applied to the light control sheet of a light control device and the evaluation results of the optical characteristics of the light control sheet. FIG. 4 shows the evaluation results for the light control device of Example 1-1, FIG. 5 shows the evaluation results for Comparative Example 1-1, and FIG. 6 shows the evaluation results for Comparative Example 1-2. FIG. 7 shows the evaluation results for the light control device of Example 2-1, FIG. 8 shows the evaluation results for the light control device of Example 2-2, FIG. 9 shows the evaluation results for the light control device of Example 2-3, and FIG. 10 shows the evaluation results for the light control device of Comparative Example 2-1.

FIG. 3 shows a schematic diagram of the L*a*b* color space.

As shown in FIG. 3, in the L*a*b* color space, the closer the lightness index L* is to 100, the closer the color of the object is to white W, whereas the closer the lightness index L* is to 0, the closer the color of the object is to black BK. The greater the color coordinate a* is in the positive direction, the closer the color is to red R, whereas the greater the color coordinate a* is in the negative direction, the closer the color is to green G. The greater the color coordinate b* is in the positive direction, the closer the color is to yellow Y, whereas the greater the color coordinate b* is in the negative direction, the closer the color is to blue BL.

As shown in FIG. 4, in the first light control sheet of the light control device of Example 1-1, when the driving voltage was 18 V, the lightness difference ΔL* was 45.3 and the color coordinate difference Δb* was −23.0. In addition, in the first light control sheet, the color coordinate a* had a local maximum value when the driving voltage was 12V, and the color coordinate b* had a local maximum value when the driving voltage was 18V. When the driving voltage was 0 V, the lightness difference ΔL* was 91.5, the color coordinate difference Δa* was −1.0, and the color coordinate difference Δb* was 2.7.

In contrast, as shown in FIG. 5, as for the first light control sheet of the light control device of Comparison Example 1-1, no driving voltage was found at which the lightness difference ΔL* is 20 or more and the color coordinate difference Δa* is 15 or more, or the color coordinate difference Δb* is 20 or more.

As shown in FIG. 6, as for the first light control sheet of the light control device of Comparison Example 1-2, no driving voltage was found at which the lightness difference ΔL* was 20 or more and the color coordinate difference Δa* was 15 or more, or the color coordinate difference Δb* is 20 or more.

As shown in FIG. 7, in the light control device of Example 2-1, when the driving voltage was 12 V, the second light control sheet showed a lightness difference ΔL* of 44.7 and a color coordinate difference Δb* of −16.4. The second light control sheet showed a lightness difference ΔL* of 45.9 and a color coordinate difference Δb* of 31.2 when the driving voltage was 24 V, and a lightness difference ΔL* of 45.2 and a color coordinate difference Δb* of 32.7 when the driving voltage was 48 V.

As shown in FIG. 8, in the light control device of Example 2-2, when the driving voltage was 48 V, the second light control sheet showed a lightness difference ΔL* of 24.0 and a color coordinate difference Δb* of −25.3. When the driving voltage was 100 V, the second light control sheet showed a lightness difference ΔL* of 26.5 and a color coordinate difference Δb* of −28.7.

As shown in FIG. 9, in the light control device of Example 2-3, when the driving voltage was 48 V, the second light control sheet showed a lightness difference ΔL* of 33.2 and a color coordinate difference Δb* of −31.5. The second light control sheet showed a lightness difference ΔL* of 41.8 and a color coordinate difference Δb* of −37.5 when the driving voltage was 100 V, and a lightness difference ΔL* of 43.0 and a color coordinate difference Δb* of −38.0 when the driving voltage was 135 V.

As shown in FIG. 10, as for the second light control sheet of the light control device of Comparison Example 2-1, no driving voltage was found at which the lightness difference ΔL* was 20 or more and the color coordinate difference Δa* was 15 or more, or the color coordinate difference Δb* was 20 or more.

As described above, according to an embodiment of the light control device, the following advantageous effects can be achieved.

By applying the third voltage VN3 to the first light control sheet 11N, the first light control sheet 11N can exhibit a color that is darker than when the second voltage VN2 is applied and has a different color coordinate a* or b* from when the second voltage VN2 is applied.

By applying the second voltage VN2 to the first light control sheet 11N, the first light control sheet 11N can be made brighter than when the first voltage VN1 is applied, while maintaining the color close to the color exhibited by the first light control sheet 11N when the first voltage VN1 is applied.

By applying a voltage at which the color coordinate a* or b* has a local maximum value to the first light control sheet 11N, it is possible to maximize the deviation in color coordinate a* or b* of the color exhibited by the first light control sheet 11N from that exhibited by the first light control sheet 11N when the first or second voltage VN1 or VN2 is applied to the first light control sheet 11N.

By applying the third voltage VR3 to the second light control sheet 11R, the second light control sheet 11R can exhibit a color that is darker than when the second voltage VR2 is applied and has a different color coordinate a* or b* from when the second voltage VR2 is applied.

By applying the third voltage VR3 to the second light control sheet 11R, the second light control sheet 11R can exhibit a color that is more noticeably different from when the second voltage VR2 is applied to the second light control sheet 11R.

Both when the second voltage VR2 is applied to the second light control sheet 11R and when the third voltage VR3 is applied to the second light sheet 11R, the second light control sheet 11R can exhibit a color different from that when the first voltage VR1 is applied.

The embodiment described above may be modified and implemented as follows.

Control Unit

The light control device may further include a control unit that changes the lightness difference ΔL* and color coordinate differences Δa* and Δb* of the light control sheet 11N or 11R in multiple levels of gradation. The control unit controls the driving of the driving unit 12 of the light control device 10N or 10R. The control unit may have information such as a table for converting different lightness differences ΔL* into driving voltages. The control unit causes the driving unit to apply a driving voltage that corresponds to the lightness difference ΔL* specified by an external operation device or the like.

Alternatively, the control unit may have information such as a table for converting different color coordinate differences Δa* into driving voltages to allow the driving unit to apply a driving voltage corresponding to the color coordinate difference Δa* specified by an external operation device or the like. Alternatively, the control unit may have information such as a table for converting different color coordinate differences Δb* into driving voltages to allow the driving unit to apply a driving voltage corresponding to the color coordinate difference Δb* specified by an external operation device or the like.

According to light control devices having these control units, it is possible to control the appearance of the light control sheet 11N or 11R according to the lightness difference ΔL* or color coordinate difference Δa* or Δb* of the light control sheet 11N or 11R desired by the user of the light control device 10N or 10R.

A technical idea derived from the above embodiments and modifications is described below.

A light control sheet includes a first transparent electrode layer, a second transparent electrode layer, and a light control layer formed between the first and second transparent electrode layers and including a transparent polymer layer having voids, and a liquid crystal composition filled in the voids. When a first voltage is applied at which a potential difference between the first and second transparent electrode layers is zero, a haze of the light control sheet is 80% or more, when a second voltage is applied, the haze of the light control sheet is less than 10%, a difference in lightness index L* between when the second voltage is applied and when a third voltage having a magnitude between the first and second voltages is applied is 20 or more, and a difference in color coordinate a* is 15 or more or a difference in color coordinate b* is 20 or more between when the second voltage is applied and when the third voltage is applied.

A light control sheet includes a first transparent electrode layer, a second transparent electrode layer, a light control layer formed between the first and second transparent electrode layers, and including a transparent polymer layer having voids, and a liquid crystal composition filled in the voids, a first alignment layer formed between the first transparent electrode layer and the light control layer, and a second alignment layer formed between the second transparent electrode layer and the light control layer. When a first voltage is applied, a haze of the light control sheet is 80% or more, and the first voltage is a minimum voltage value at which the haze of the light control sheet is 80% or more, when a second voltage is applied at which a potential difference between the first and second transparent electrode layers is zero, the haze of the light control sheet is 15% or less, a difference in lightness index L* between when the second voltage is applied and when a third voltage having a magnitude between the first and second voltages is applied is 20 or more, and a difference in color coordinate a* is 15 or more or a difference in color coordinate b* is 20 or more between when the second voltage is applied and when the third voltage is applied.

A light control sheet according to an embodiment of the present invention, by applying the third voltage to the light control sheet, can exhibit a color that is darker than when the second voltage is applied and has a different color coordinate a* or b* from when the second voltage is applied.

A light control sheet is of a normal type or a reverse type. A light control sheet of the normal type includes first and second transparent electrode layers, and a light control layer formed between the first and second transparent electrode layers. The light control layer contains positive-type liquid crystal molecules. A light control sheet of the reverse type further includes first and second alignment layers as compared with the normal type. The first alignment layer is formed between the light control layer and the first transparent electrode layer, and the second alignment layer is formed between the light control layer and the second transparent electrode layer. The light control layer contains negative-type liquid crystal molecules.

A normal-type light control sheet of a light control device is opaque when there is no potential difference between the transparent electrode layers and is transparent when there is a potential difference between the transparent electrode layers. In contrast, a reverse-type light control sheet of a light control device is transparent when there is no potential difference between the transparent electrode layers and is opaque when there is a potential difference between the transparent electrode layers (see, for example, JP 2021-9187 A).

Light control sheets can be attached to transparent members provided in windows of various buildings, partitions in offices, display windows in stores, and the like. In recent years, light control sheets have also been applied to transparent members provided in windows of moving objects such as vehicles and aircraft. With the increase in the range of objects to which light control sheets are attached, there is a demand for light control sheets that can add further decoration to the objects to which they are attached in addition to being transparent or opaque.

A light control device according to an embodiment of the present invention includes a light control sheet including a first transparent electrode layer, a second transparent electrode layer, and a light control layer formed between the first and second transparent electrode layers, and including a transparent polymer layer having voids, and a liquid crystal composition filled in the voids; and a driving unit that applies voltage to the light control sheet. The driving unit applies first to third voltages to the light control sheet, the potential difference between the first and second transparent electrode layers is zero at the first voltage, and the third voltage has a magnitude between the first and second voltages. The haze of the light control sheet is 80% or more when the first voltage is applied, and the haze of the light control sheet is less than 10% when the second voltage is applied. In the light control sheet, the difference in lightness index L* between when the second and third voltages are applied is 20 or more, and the difference in color coordinate a* is 15 or more or the difference in color coordinate b* is 20 or more between when the second and third voltages are applied.

A light control device according to another embodiment of the present invention includes a light control sheet including a first transparent electrode layer, a second transparent electrode layer, a light control layer formed between the first and second transparent electrode layers, and including a transparent polymer layer having voids, and a liquid crystal composition filled in the voids, a first alignment layer formed between the first transparent electrode layer and the light control layer, and a second alignment layer formed between the second transparent electrode layer and the light control layer; and a driving unit that applies voltage to the light control sheet. The driving unit applies first to third voltages to the light control sheet, the potential difference between the first and second transparent electrode layers is zero at the second voltage, and the third voltage has a magnitude between the first and second voltages. When the first voltage is applied, a haze of the light control sheet is 80% or more, and the first voltage is a minimum voltage value at which the haze of the light control sheet is 80% or more, and when the second voltage is applied, the haze of the light control sheet is 15% or less. In the light control sheet, the difference in lightness index L* between when the second and third voltages are applied is 20 or more, and the difference in color coordinate a* is 15 or more or the difference in color coordinate b* is 20 or more between when the second and third voltages are applied.

Obviously, numerous modifications and variations of the present invention are possible in light of the above teachings. It is therefore to be understood that within the scope of the appended claims, the invention may be practiced otherwise than as specifically described herein.

The invention claimed is:

1. A light control device, comprising:

a light control sheet comprising a first transparent electrode layer, a second transparent electrode layer, and a light control layer formed between the first and second transparent electrode layers; and a driving unit comprising circuitry configured to apply a first voltage, a second voltage, and a third voltage to the light control sheet such that a potential difference between the first transparent electrode layer and the second transparent electrode layer is zero at the first voltage and that the third voltage has a magnitude between the first and second voltages, wherein the light control layer of the light control sheet includes a transparent polymer layer having a plurality of voids and a liquid crystal composition filling the voids, and the light control sheet has a haze of 80% or more when the first voltage is applied, the haze of less than 10% when the second voltage is applied, a difference of 20 or more in lightness index L* between when the second voltage is applied and when the third voltage is applied, and a difference of 15 or more in color coordinate a* or a difference of 20 or more in color coordinate b* between when the second voltage is applied and when the third voltage is applied.

2. The light control device according to claim 1, wherein the light control sheet has a difference of 90 or more in lightness index L* between when the second and first voltages are applied is, a difference of 1.5 or less in color coordinate a* between when the second and first voltages are applied, and a difference of 3.0 or less in color coordinate b* between when the second and first voltages are applied.

3. The light control device according to claim 1, wherein the light control sheet has the color coordinates a* and b* having local maximum values at a voltage having a magnitude between the first and second voltages.

4. The light control device according to claim 2, wherein the light control sheet has the color coordinates a* and b* having local maximum values at a voltage having a magnitude between the first and second voltages.

5. A light control device, comprising:

a light control sheet comprising a first transparent electrode layer, a second transparent electrode layer, a light control layer formed between the first and second transparent electrode layers, a first alignment layer formed between the first transparent electrode layer and the light control layer, and a second alignment layer formed between the second transparent electrode layer and the light control layer; and a driving unit comprising circuitry configured to apply a first voltage, a second voltage, and a third voltage to the light control sheet such that a potential difference between the first transparent electrode layer and the second transparent electrode layer is zero at the second voltage and that the third voltage has a magnitude between the first and second voltages, wherein the light control layer of the light control sheet includes a transparent polymer layer having a plurality of voids and a liquid crystal composition filling the voids, and the light control sheet has a haze of 80% or more when the first voltage is applied and is a minimum voltage value, the haze of 15% or less when the second voltage is applied, a difference 20 or more in lightness index L* between when the second voltage is applied and when the third voltage is applied, and a difference of 15 or more in color coordinate a* or a difference of is 20 or more in color coordinate b* between when the second voltage is applied and when the third voltage is applied.

6. The light control device according to claim 5, wherein the light control sheet has a difference of 30 or more in the color coordinate b* between when the second and third voltages are applied.

7. The light control device according to claim 5, wherein the light control sheet has a difference of 20 or more in the color coordinate b* between when the second and third voltages are applied, a difference of 20 or more in lightness index L* between when the second and first voltages are applied, and a difference of 20 or more in color coordinate b* between when the second and first voltages are applied.

8. The light control device according to claim 6, wherein the light control sheet has a difference of 20 or more in the color coordinate b* between when the second and third voltages are applied, a difference of 20 or more in lightness index L* between when the second and first voltages are applied, and a difference of 20 or more in color coordinate b* between when the second and first voltages are applied.

9. The light control device of claim 1, wherein the transparent polymer layer includes a polymer network structure defining the plurality of voids.

10. The light control device of claim 5, wherein the transparent polymer layer includes a polymer network structure defining the plurality of voids.

* * * * *